Patented Oct. 29, 1946

2,410,025

UNITED STATES PATENT OFFICE 2,410,025

PRODUCTION OF COLORED PHOTOGRAPHIC PICTURES

Béla Gáspár, Hollywood, Calif., assignor to Chromogen, Incorporated, a corporation of Nevada No Drawing. Continuation of application Serial No. 412,341, September 25, 1941, which is a division of application Serial No. 179,591, December 13, 1937. This application February 7, 1944, Serial No. 521,439. In Great Britain December 14, 1936

24 Claims. (Cl. 95—6)

This application is a continuation of my application Serial No. 412,341, filed September 25, 1941, which is a division of application Serial No. 179,591, filed December 13, 1937, now Reissue Patent 22,308.

In my earlier patents a process has been described for the production of dyestuff images from diffusely dyed silver images. Thus, for example, according to my United States Letters Patent No. 2,020,775, dated November 12, 1935, the production of such dyestuff images is performed by treating the diffusely dyed silver image with solutions which destroy the dye locally in the presence of the metal deposit of the photographic image. At the same time the silver is partially or totally converted into a silver compound. Individual cases, in which the destruction of the dye can be accelerated by the addition of certain substances, have been described in my above-mentioned patent.

It has been found that the effectiveness of the dye-destroying solutions described in my United States Letters Patent No. 2,020,775 and of the other dye-destroying baths which were found to be applicable in the process can be accelerated by a great number of substances other than those heretofore known. A large number of the substances added in accordance with this invention enable the treating solutions to work in a much more effective manner, e. g., in a much shorter time or in far smaller concentration, than the products previously proposed as accelerators.

In view of the great effectiveness of the additions, much smaller amounts of these accelerating substances are sufficient. In many cases the presence of the accelerating compounds in the ratio of 1:100,000 is sufficient to multiply the effectiveness of the dye-destroying solution.

As substances which I have found to be strong accelerators, the following may be mentioned:

2,3-di-amino-phenazine of the following formula:

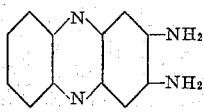

2-oxy-3-amino-phenazine of the following formula:

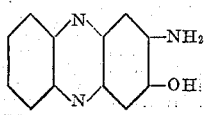

Quinoxaline of the following formula:

Diphenyl-quinoxaline of the following formula:

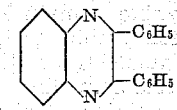

or similar compounds of the general formula:

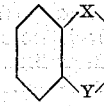

of which the formula:

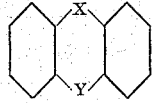

is a more specific example. In this formula X and Y represent groups like nitrogen, sulfur, oxygen, carbonyle C=O, carbimino C=NH, and the like. The compounds may be substituted by amino-groups, oxy-groups, alkyl-groups, aryl-groups, or other substituents including also sulfonic-groups.

Example 1

A 1% aqueous solution of hydrochloric acid which alone will not work satisfactorily on a layer diffusely colored by Diamine Fast Pink G (a dyestuff furnished by the I. G. Farbenindustrie Akt. Ges.) may be activated by the addition of 0.002% of 2,3-diamino-phenazine.

Example 2

The action of a 2½% aqueous solution of hydrobromic acid on the dyestuff Heliotrope B (Schultz Farbstofftabellen, 1931, 7th edition, vol. 1, No. 494) may be considerably accelerated by the addition of 0.002% of diamino-phenazine. Even the addition of 7 parts of diamino-phenazine to one million parts of a hydrobromic acid solution of 1.66% strength has a distinct accelerating effect on the local destruction of Heliotrope B.

Example 3

For the production of multicolor images a multi-layer material may be used having different dyestuffs incorporated in layers in which different color selection pictures are recorded. The dyestuffs may be for example Diamine Pure Blue FF (Schultz loc. cit. No. 510), Benzo-Light-Yellow 4 GL extra (Schultz loc. cit. No. 308) and Sirius Ruby B (furnished by the I. G. Farbenindustrie Akt. Ges.). The dye-destroying solution consists of 4% aqueous solution of hydrobromic acid which has been activated by the addition of 0.002% of diamino-phenazine.

*Example 4*

A solution containing 70 g. thiocarbamide, 30 g. hydroquinone, 50 g. chrome alum, 5 ccm. sulfuric acid (d=1.85) per liter, with the addition of 0.2 g. 2,3-diamino-phenazine is used for treating exposed and developed silver halide layers containing the dyestuff obtained from diazotised ortho-anisidine and resorcinol. A dyestuff image is obtained after seven minutes' treating.

*Example 5*

A solution containing 74 g. potassium bromide and 17½ ccm. sulfuric acid (d=1.84) per liter is saturated with 2,3-diphenyl-quinoxaline and then contains less than 0.01 g. per liter of this substance. The solution acts on silver images dyed with the dyestuff obtained from diazotised 4-amino-1-benzoylamino 3-methoxy-6-methylbenzol and β-naphtol within 25 minutes or on the dyestuff obtained from diazotised o-anisidine and resorcinol within 30 minutes or on the dyestuff obtained from diazotised p-nitraniline and β-naphtol within 60 minutes.

With this dyestuff and with the same treating bath the same result is obtained if, instead of the 2,3-diphenyl-quinoxaline, the 2,3-dimethyl-quinoxaline, the 2-oxy-3-methylquinoxaline or ordinary quinoxaline are used, 2 g. of each accelerator being used per liter. The dyestuffs chosen for the tests are in most case insoluble azodyestuffs which in themselves are difficult to bleach out. In using dyestuffs of this sort, the differences are naturally more evident than if dyestuffs are employed wihch are bleached out in a shorter time in a dyestuff destroying bath without admixture. In using insoluble dyestuffs which are difficultly bleached, the difference is so great that, for instance, the thio-carbamide bath mentioned in Example 4 which with an admixture of, for instance, 2,3-diamino-phenazine destroys the dyestuffs locally after 7 or 8 minutes of treatment shows practically no useful effect if the accelerating substance is omitted, even if the time of treatment is doubled.

Mention should, however, be made of the fact that the application of the admixtures has certain advantages even in the case of easily soluble and easily bleaching dyestuff, such as a shortening of the time of treatment and thereby a decrease of the detrimental effect on the layer.

The results of a large number of compounds which have been tested and found to be useful accelerators are given in the following list which shows the accelerating effect obtained by the addition of various substances to a number of treating baths used in producing dyestuff images from silver images dyed by six different dyestuffs. These dyestuffs are:

A. Pontamine Sky Blue 6 B (Schultz loc. cit. No. 510).
B. Chlorantine Light Green BB Ciba.
C. Tuchecht Brillantrot 2 B Ciba.
D. Benzolight Red 8 BL (Schultz loc. cit. No. 566).
E. Congo Sky Blue (Schultz loc. cit. No. 513).
F. Chlorantine Fast Orange TRL (Schultz loc. cit. No. 706).

| No. | Catalyst | Accelerating effect on hydrochloric acid 11% | Dyestuff used |
|---|---|---|---|
| 1 | Benzhydrol | ++ | A, B, C. |
| 2 | Alphabenzil-dioxime | +++ | A, B, C. |
| 3 | Benzophenone-anil | ++++ | A, B. |
| 4 | Cyanamide | + | C. |
| 5 | Diacetyl-monomethoxime | ++ | A, B, C. |
| 6 | Diacetyl-monoxime | ++ | A, B. |
| 7 | Dibenzylamine | ++++ | A, B. |
| 8 | Diphenyl-piperazine | ++ | A, B. |
| 9 | Diphenyl-thiocarbazone | +++ | A, B. |
| 10 | Hydrobenzamide | +++ | A, B, C. |
| 11 | Methylene-amino-acetonitrile | ++ | A, B. |
| 12 | Quinizarine | +++ | A, B. |
| 13 | Quinophtalone | ++++ | B. |
| 14 | 2,2',4,4'-tetramino-5,5'-dimethyl-diphenylmethane | ++++ | A, B. |
| 15 | Tetra-ethyl-p-diamino-benzophenone | ++++ | A, B. |
| 16 | Tetra-ethyl-p-p'-diamino-diphenyl-methane | ++++ | A, B. |
| 17 | Benzothio-diazol | +++ | A, B, C. |
| 18 | 2,3 dimethyl-quinoxaline | ++++ | A, B. |
| 19 | 2,3 diamino-phenazine | +++++ | A, B, C. |
| 20 | 2-oxy-3-amino-phenazine | +++++ | A, B, C. |
| 21 | N,N'-di(paraamino-phenyl) N,N'-dimethyl-ethylene-diamine | ++++ | A, B. |
| 22 | Methyl violett B | +++ | A, B, C. |
| 23 | Auramine | ++++ | A, B. |
| 24 | Diacetyl-p-phenylene-diamine | +++ | A, B, C. |
| 25 | S-diphenylethylene-diamine | +++ | A, B. |
| 26 | 2,4-diaminodiphenylamine | ++++ | A, B. |
| 27 | Quinizarine sulphonic acid | +++ | A, B. |
| 28 | Sodium indigo sulphonate | ++++ | A, B. |
| 29 | 1,2,4-triaminobenzene-trihydrochloride | ++++ | A, B. |
| 30 | Tetramethyl-diamino-benzhydrol | ++ | A, B, C. |
| 31 | Tetramethyl-p-diamino-benzophenone | ++ | A, B, C. |
| 32 | Tetramethyl-p-phenylene-diamine-hydrochloride | ++ | A, B, C. |
| 33 | Tetramethyl-p-diamino-diphenyl methane | +++ | A, B, C. |
| 34 | N-methyl-quinolone | Hydrobromic acid 5% +++ | A, B. |
| 35 | ----do---- | Hydrochloric acid 11% +++ | A, B. |
| 36 | Acetone-phenylhydrazone | +++ | A, B. |
| 37 | Acetone-oxime | + | C. |
| 38 | Acridone |  | A, B. |
| 39 | 6-amino-purine sulphate | ++ | A, B. |
| 40 | Amino-pyrine | ++ | A, B, C. |
| 41 | Allantoin | ++ | A, B. |
| 42 | Anthraquinone-betasulphonic acid | +++++ | A, B. |
| 43 | Benzalmethylamine | +++ | A, B, C. |
| 44 | Diacetyl-o-phenylendiamine | +++ | A, B. |
| 45 | Benzthiazyl hydrazine |  | A, B. |
| 46 | 2,chlor-4,6-diamino-benzol | ++++ | A, B. |
| 47 | Sym.diphenyl-carbazide | ++ | A, B. |
| 48 | Anthraquinone | +++ | A, B, C. |

| No. | Catalyst | Accelerating effect on hydrochloric acid 11% | Dyestuff used |
|---|---|---|---|
| 49 | 2,3-diphenyl-quinoxaline | ++++ | A, B. |
| 50 | 1,amino-anthraquinone | ++++ | A, B. |
| 51 | 2,amino-anthraquinone | ++++ | A, B. |
| 52 | Anthragallol | +++ | A, B. |
| 53 | 1,methyl-2-pyridone | +++ | A, B, C. |
| 54 | Alizarine-red-S | ++++ | A, B. |
| 55 | Alizarine-red-agfa | ++++ | A, B. |
| 56 | Di-hydro-2-hydroxy-quinoxaline | ++++ | A, B. |
| 57 | Fuchsine | ++ | A. |
| 58 | Anthraquinone-beta-sulphonic acid | Sodium hyposulphite 20% +++ ($Na_2S_2O_3$). | D. |
| 59 | Tetramethyl-p-diamino benzophenone | Accelerating effect on hydrochloric acid 11% +++ | D. |
| 60 | Quinizarine sulphonic acid | Sodium chloride 20% plus hydrochloric acid +++ | E. |
| 61 | do | Magnesium chloride 20% plus hydrochloric acid. +++ | F. |
| 62 | Dimethylaminostyryl dimethyl-thiazol-N-methyliodide | Hydrochloric acid 11%. +++ | A, B. |
| 63 | 6,methoxy-pseudocyanine N-ethyl-iodide | +++ | A, B. |
| 64 | N-ethyl-6,methoxy-thiocarbocyanine-iodide | +++ | A, B. |
| 65 | N-ethyl-benzthioazol-carbocyanine-iodide | +++ | A, B. |
| 66 | Quinone | ++ | A, B, C. |
| 67 | Benzalaniline | +++ | C. |
| 68 | Hexamethylenetetramine | +++ | A, B. |
| 69 | Benzalazine | +++ | A, B. |
| 70 | p-Toluol-sulphinic acid | + | C. |
| 71 | Benzene-1-sulphonic 3-sulphinic acid | + | C. |
| 72 | Naphtalene-1-sulphonic 4-sulphinic acid | + | C. |
| 73 | (3)-nitrostyryl-quinolinium-N-ethyl-ethylsulphonate | +++ | A, B. |
| 74 | (3)-nitrostyryl-benz-thiazol-ethyl-sulphonate | +++ | A, B. |
| 75 | (3)-sulpho-styryl-pseudo-thiohydantoine | +++ | A, B. |
| 76 | Styryl-quinolinium-ethyl-sulphonate | +++ | A, B. |
| 77 | (4)-dimethylamino-styryl-rhodanine | ++ | A, B. |
| 78 | Bis (4-dimethylamino-2-nitro-phenyl)disulphide | +++ | A, B. |

The foregoing list of accelerating compounds embodies the results obtained with catalysts belonging to various classes of compounds. It includes, for example, substances of the general type disclosed in my earlier Patent No. 2,020,775, dated November 12, 1935. In addition, the list includes compounds of the class of reducible organic substances, the reduction products of which are re-oxidizable during the treatment of a dyed silver image to the original reducible substance which are claimed in application Serial No. 179,591, now Reissue Patent 22,308. The claims of the present application are directed to dye destruction baths and processes employing diphenylmethane and triphenyl-methane derivatives although the general listing of compounds have been set forth to indicate the comparative activity of the various accelerating compounds.

The quantity of the added catalyst was 0.2% in the experiments Nos. 1 to 57 and 60 to 69 of the list, 0.8% was used in No. 58 and 0.5% was used in No. 59. In Nos. 70 to 72, 1% of the addition was used. In Nos. 73 to 77 the quantity of the addition was again 0.05%. In many cases far smaller quantities of the catalyst may be used for practical purposes.

As can be seen, the new catalysts belong to different chemical groups. They are in most cases organic substances which can be easily hydrated or dehydrated. Compounds, the reduction products or oxidation products of which are capable of forming a reversible redox-system, are especially suitable. See, for example, Nos. 26, 33, 57. Furthermore, organic bases which can be easily oxidized may be used. See Nos. 29, 32, 44. In many cases the bases themselves are not especially effective but can be rendered more suitable by the formation of oxidation products by autoxidation. The oxidation products of such bases are very suitable catalysts. Heterocyclic bases can also be used. See Nos. 17, 8. In many cases the compounds which are found to be suitable catalysts are characterized by the presence of a =CO group or =CS group, these groups being present in a carbocyclic or heterocyclic nucleus. See No. 53. If the =CO group appears several times in such a compound as is the case in quinone or quinone derivatives the effectiveness is especially good. See Nos. 48, 50, 51, 52, 58, 42, 66.

Aliphatic compounds with =CO groups or =CS groups are also suitable in many cases. See Nos. 15, 31. Here again several of such groups may be present in the molecule. In other cases the effective compounds are characterized by the presence of the group =C=N—, either in a ring system (No. 39) or in an open chain. See Nos. 2, 3, 5, 6, 11, 36, 37, 43. Compounds of the quinone-imide type or indophenols belong to this group of catalysts. Also the compounds containing the —C=N group show in many cases an accelerating effect. A large class of accelerators is found in the class of sensitizing or desensitizing dyestuffs. See, for example, Nos. 62, 63, 64, 73 to 77. The capacity of accelerating appears to be in no direct proportion to the sensitizing properties but on the contrary to be based mainly on the fact that these dyestuffs usually belong to one of the above-mentioned groups of accelerating substances. It may be noted that organic sulphocompounds, compounds containing —S—S—, —S—H or —SO₂H groups are also suitable accelerators. The soluble derivatives of vat dyes are found to be also effective as catalysts. The tests described in the above given list of results are only examples of suitable catalysts and dyes and may be regarded as an illustration only of the new process without restriction to the dyes, catalysts or treating solutions used in the examples.

What I claim is:

1. In a process of producing a photographic dyestuff image in a photographic emulsion uniformly dyed by an azo-dye and also comprising a metal image, the step of treating said metal image with a solution containing an agent which is nondestructive with respect to the dyestuff, but which reacts with the said metal to oxidize it and substantially simultaneously to form a reducing substance which destroys said azo-dye at the points of the metal image, said solution further containing a small amount of a diphenylmethane derivative which is reducible and the reduction products thereof are reoxidizable during the treatment of the metal image to the original diphenylmethane derivative.

2. In a process of producing a photographic dyestuff image from a silver image uniformly dyed by an azo-dye, the step of treating said silver image with a solution containing a substance capable of selectively destroying said azo-dye by reduction in the presence of a photographic silver image and comprising a small amount of a reducible diphenylmethane derivative, the reduction products of which are re-oxidizable during the treatment of said silver image with said solution to the original reducible diphenylmethane derivative.

3. In a process of producing a photographic dyestuff image in a photographic emulsion uniformly dyed by an azo-dye and also comprising a silver image, the step of treating said silver image with a solution containing an agent capable of forming complex silver compounds and which acts to selectively destroy said azo-dye by reduction in the presence of said silver image and a small amount of diphenylmethane derivative which is reducible and the reduction products thereof are re-oxidizable during the treatment of the silver image to the original diphenylmethane derivative.

4. In a process of producing a photographic dyestuff image from a silver image uniformly dyed by an azo-dye, the step of treating said silver image with a solution comprising hydrohalic acid and a small amount of a diphenylmethane derivative which is reducible and the reduction products thereof are re-oxidizable during the production of said dyestuff image to the original diphenylmethane derivative.

5. In a process of producing a photographic dyestuff image from a silver image uniformly dyed by an azo-dye, the step of treating said silver image with a solution comprising thiocarbamide and a small amount of a diphenylmethane derivative which is reducible and the reduction products thereof are re-oxidizable during the production of said dyestuff image to the original diphenylmethane derivative.

6. In a process of producing a photographic dyestuff image from a silver image uniformly dyed by an azo-dye, the step of treating said silver image with a solution comprising hydrochloric acid and a small amount of a diphenylmethane derivative which is reducible and the reduction products thereof are re-oxidizable during the production of said dyestuff image to the original diphenylmethane derivative.

7. A treating bath for producing a photographic dyestuff image in a photographic emulsion uniformly dyed by an azo-dye and also comprising a silver image, comprising a substance which is non-destructive with respect to the dyestuff, but reacts with the silver to oxidize it and substantially simultaneously to form a reducing substance which destroys said azo-dye at the points of the silver image and also comprising a small amount of a diphenylmethane derivative which is reducible during the production of the dyestuff image.

8. A treating bath for producing a photographic dyestuff image in a photographic emulsion uniformly dyed by an azo-dye and also comprising a silver image, comprising a substance capable of selectively destroying said azo-dye by reduction in the presence of said silver image, said bath also comprising a small amount of a diphenylmethane derivative which is reducible during the production of said dyestuff image.

9. A treating bath for producing a photographic dyestuff image in a photographic emulsion uniformly dyed by an azo-dye and also comprising a silver image, comprising a substance capable of forming complex silver compounds and which acts to selectively destroy said azo-dye by reduction in the presence of said silver image and a small amount of a diphenylmethane derivative which is reducible during the production of said dyestuff image.

10. A treating bath for producing a photographic dyestuff image in a photographic emulsion uniformly dyed by an azo-dye and also comprising a silver image, comprising hydrohalic acid and a small amount of a diphenylmethane derivative which is reducible during the production of said dyestuff image.

11. A treating bath for producing a photographic dyestuff image in a photographic emulsion uniformly dyed by an azo-dye and also comprising a silver image, comprising thiocarbamide and a small amount of a diphenylmethane derivative which is reducible during the production of said dyestuff image.

12. A treating bath for producing a photographic dyestuff image in a photographic emulsion uniformly dyed with an azo-dye and also comprising a silver image, comprising hydrochloric acid and a small amount of a diphenylmethane derivative which is reducible during the production of the said dyestuff image.

13. In a process of producing a dyestuff image in a photographic emulsion comprising a silver image and a uniformly distributed azo-dyestuff, the step of treating said azo-dyestuff in the presence of said silver image with thio-carbamide, said treatment being carried out in the presence of a small amount of a diphenylmethane derivative which is reducible and the reduction products thereof are re-oxidizable during the production of said dyestuff image to the original diphenylmethane derivative.

14. In a process of producing a dyestuff image in a photographic emulsion comprising a silver image and a uniformly distributed azo-dyestuff, the step of treating said azo-dyestuff in the presence of said silver image with hydrohalic acid, said treatment being carried out in the presence of a small amount of a diphenylmethane derivative which is reducible and the reduction products thereof are re-oxidizable during the production of said dyestuff image to the original diphenylmethane derivative.

15. In a process of producing a dyestuff image in a photographic emulsion comprising a silver image and a uniformly distributed azo-dyestuff, the step of treating said azo-dyestuff in the presence of said silver image with hydrochloric acid, said treatment being carried out in the presence of a small amount of a diphenylmethane derivative which is reducible and the reduction products thereof are re-oxidizable during the production of said dyestuff image to the original diphenylmethane derivative.

16. A treating bath for producing a photographic dyestuff image in a photographic emulsion uniformly dyed by an azo-dye and also comprising a silver image, comprising a substance capable of selectively destroying said azo-dye by reduction in the presence of said silver image, said bath also comprising a small amount of an organic compound soluble therein and capable of accelerating the selective dye destructive action of said substance, said compound being selected from the group consisting of diphenylmethane derivatives and triphenylmethane derivatives.

17. A treating bath for producing a photographic dyestuff image in a photographic emulsion uniformly dyed by an azo-dye and also comprising a silver image, comprising hydrohalic acid and a small amount of an organic compound soluble in said bath and capable of accelerating the selective dye destructive action of said hydrohalic acid, said compound being selected from the group consisting of diphenylmethane derivatives and triphenylmethane derivatives.

18. A treating bath for producing a photographic dyestuff image in a photographic emulsion uniformly dyed by an azo-dye and also comprising a silver image, comprising thiocarbamide and a small amount of an organic compound soluble in said bath and capable of accelerating the selective dye destructive action of said thiocarbamide, said compound being selected from the group consisting of diphenylmethane derivatives and triphenylmethane derivatives.

19. A treating bath for producing a photographic dyestuff image in a photographic emulsion uniformly dyed by an azo-dye and also comprising a silver image, comprising hydrochloric acid and a small amount of an organic compound soluble in said bath and capable of accelerating the selective dye destructive action of said hydrochloric acid, said compound being selected from the group consisting of diphenylmethane derivatives and triphenylmethane derivatives.

20. In a process of producing a dyestuff image from a silver image and a uniformly distributed azo-dyestuff in a photographic emulsion, the step of treating said azo-dyestuff in the presence of said silver image with a substance capable of selectively destroying said azo-dyestuff by reduction in the presence of a photographic silver image, said treatment being carried out in the presence of a small amount of an organic compound capable of accelerating the selective dye destructive action of said substance, said compound being selected from the group consisting of diphenylmethane derivatives and triphenylmethane derivatives.

21. In a process of producing a dyestuff image from a silver image and a uniformly distributed azo-dyestuff in a photographic emulsion, the step of treating said azo-dyestuff in the presence of said silver image with thio-carbamide, said treatment being carried out in the presence of a small amount of an organic compound capable of accelerating the selective dye destructive action of said thiocarbamide, said compound being selected from the group consisting of diphenylmethane derivatives and triphenylmethane derivatives.

22. In a process of producing a dyestuff image from a silver image and a uniformly distributed azo-dyestuff in a photographic emulsion, the step of treating said azo-dyestuff in the presence of said silver image with hydrohalic acid, said treatment being carried out in the presence of a small amount of an organic compound capable of accelerating the selective dye destructive action of said hydrohalic acid, said compound being selected from the group consisting of diphenylmethane derivatives and triphenylmethane derivatives.

23. In a process of producing a dyestuff image from a silver image and a uniformly distributed azo-dyestuff in a photographic emulsion, the step of treating said azo-dyestuff in the presence of said silver image with hydrochloric acid, said treatment being carried out in the presence of a small amount of an organic compound capable of accelerating the selective dye destructive action of said hydrochloric acid, said compound being selected from the group consisting of diphenylmethane derivatives and triphenylmethane derivatives.

24. In a process of producing a dyestuff image in a photographic emulsion comprising a silver image and a uniformly distributed azo-dyestuff, the step of treating said azo-dyestuff in the presence of said silver image with a substance capable of selectively destroying said azo-dyestuff by reduction in the presence of a photographic silver image, said treatment being carried out in the presence of a small amount of a diphenylmethane derivative which is reducible and the reduction products thereof are re-oxidizable during the production of said dyestuff image to the original diphenylmethane derivative.

BÉLA GÁSPÁR.